United States Patent
Desai et al.

(10) Patent No.: US 8,361,205 B2
(45) Date of Patent: *Jan. 29, 2013

(54) MODULAR COMPACT ADSORPTION BED

(75) Inventors: Ashwin Desai, Amherst, NY (US); Cem E. Celik, Grand Island, NY (US); Mark William Ackley, East Aurora, NY (US); James Smolarek, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 481 days.

This patent is subject to a terminal disclaimer.

(21) Appl. No.: 12/646,183

(22) Filed: Dec. 23, 2009

(65) Prior Publication Data

US 2011/0146494 A1 Jun. 23, 2011

(51) Int. Cl.
*B01D 53/02* (2006.01)

(52) U.S. Cl. .................. 96/121; 96/130; 96/134; 95/96

(58) Field of Classification Search ........ 95/96; 96/115, 96/130
See application file for complete search history.

(56) References Cited

U.S. PATENT DOCUMENTS

| | | |
|---|---|---|
| 711,187 A | 10/1902 | Stone |
| 2,055,774 A | 9/1936 | Ray |
| 2,080,578 A | 5/1937 | Ray |
| 3,186,149 A | 6/1965 | Ayers |
| 3,590,561 A | 7/1971 | Marble |
| 3,873,287 A | 3/1975 | Barnebey |
| 4,969,936 A | 11/1990 | Schweigert et al. |
| 5,290,345 A | 3/1994 | Osendorf et al. |
| 5,324,159 A | 6/1994 | Nowobilski et al. |
| 6,436,175 B1 | 8/2002 | Coates et al. |
| 6,533,847 B2 | 3/2003 | Seguin et al. |
| 6,802,889 B2 | 10/2004 | Graham et al. |
| 6,916,360 B2 | 7/2005 | Seguin et al. |
| 7,122,073 B1 | 10/2006 | Notaro et al. |
| 7,879,138 B2 | 2/2011 | Lee et al. |

FOREIGN PATENT DOCUMENTS

GB 606867 A 8/1948

OTHER PUBLICATIONS

Pushnov, A.S., "Calculation of Average Bed Porosity", *Chemical and Petroleum Engineering*, vol. 42, Nos. 1-2, pp. 14-17 (2006).
Ergun, S. "Fluid Flow Through Packed Columns" *Chemical Engineering Progress*. vol. 48, No. 2 (1952) pp. 89-94.
Gross et al. "An Instrument for Determining the Volume and Bulk Density of Granular Materials". *ASTM Bulletin*, (1948) pp. 55-59.

*Primary Examiner* — Duane Smith
*Assistant Examiner* — Christopher P Jones
(74) *Attorney, Agent, or Firm* — Salvatore P. Pace

(57) ABSTRACT

A modular and compact adsorbent bed structure is disclosed for use in an adsorption-based gas separation plant. The conventional adsorbent bed in a gas separation plant is replaced with a plurality of modular adsorbent bed units connected to make the adsorbent bed structure. The modular design requires lower fabrication and maintenance costs; is easier to transport; and is easier to load with adsorbent material.

14 Claims, 3 Drawing Sheets

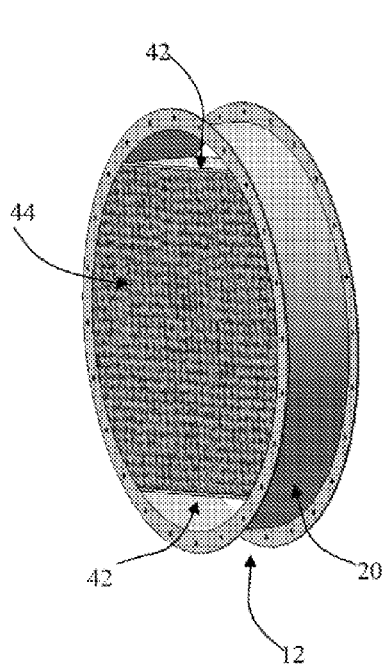
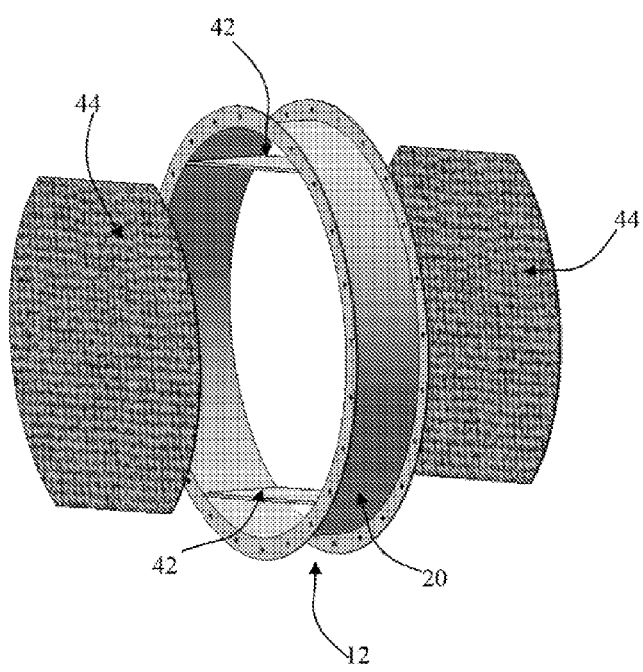
FIG. 3a  FIG. 3b

MODULAR COMPACT ADSORPTION BED

FIELD OF THE INVENTION

The present invention relates generally to the field of adsorption beds, particularly adsorption beds for use in gas separation processes. More specifically, this invention relates to modular compact adsorbent bed units which can be combined to provide full sized adsorbent bed structures used in adsorption-based gas separation processes.

BACKGROUND OF THE INVENTION

Gas separation processes using adsorbent beds are well known in the art. Typical adsorption-based processes include those where a gas component within a multi-component feed gas is selectively adsorbed. Of particular interest are cyclic processes wherein the adsorbed gas is removed from the adsorbent material in a reverse gas flow such as pressure swing adsorption (PSA) and vacuum pressure swing adsorption (VPSA) processes. These processes have evolved significantly over the last few years with improvements being made to the adsorbent materials, the adsorbent beds, and the overall process parameters and controls. Costs for the construction and operation of such plants are constantly being driven lower by competitive market pressures and it has become paramount to reduce the costs associated with designing, building, transporting and operating such plants by decreasing bed sizes and standardizing components. Smaller bed structures reduce the adsorbent material inventory; the size of the plant equipment, such as process vessels and surge tanks, and the overall plant footprint including the skid dimensions. Smaller skids in turn reduce transportation and installation costs.

It is therefore desirable to design new adsorbent beds for use in adsorption-based gas separation processes that are generally smaller in size; require lower fabrication costs; are easier to transport; have less maintenance and repair requirements; and are easier to load with adsorbent material. It is equally important to design adsorbent beds that, while being smaller, do not negatively affect the process flow, cycle speed, rate and volume of throughput, and overall power requirements of the process. Significant capital cost savings can be achieved using a modular and/or compact adsorbent bed structure in an adsorption-based gas separation plant.

For the purposes of the present invention, the term "modular" means reconfiguring a given frontal flow area of a conventional bed into smaller more manageable sections that fit into a housing wherein each bed unit or module is easier to load adsorbent material into, easier to handle and/or replace in the housing, and generally provide greater flexibility in design of the overall adsorption bed structure. Likewise, the term "compact" in the present invention refers to sections or units which provide intensification of the process by decreasing the adsorbent volume required for a given feed flow (by decreasing the bed depth) when cycling the process at a faster rate. In the present invention, a conventional packed bed in a gas separation plant is replaced with a plurality of modular adsorbent bed units. Individual modular adsorbent bed units, containing the adsorbent material, are combined to construct a fully sized adsorbent bed structure or vessel having the size and dimensions required for the particular plant requirements. When the modular adsorbent bed units are also made compact, then additional savings and design flexibility are possible due the reduced amount of adsorbent material required.

The present adsorption bed structure also brings together the benefits of a modular compact design utilizing low inlet void volumes, large bed frontal areas, and short bed depths (transfer lengths). It brings together these factors into a modular and scalable adsorbent bed and vessel design, requiring decreased adsorbent inventory, smaller plant equipment and hence, smaller dimensions. The compact configuration also provides higher capacity of product per unit volume of adsorbent material (i.e., increased adsorbent utilization) as compared to that obtained from a conventional packed bed. The present invention may substantially reduce the pressure drop in the adsorbent bed by optionally providing a very large flow area (frontal area) combined with shorter bed depths facilitating faster cycles in the preferred cyclic processes.

BRIEF SUMMARY OF THE INVENTION

The present invention provides a novel modular compact design for adsorbent bed structures used in adsorption-based gas separation processes and is particularly suitable for cyclic processes such as pressure swing adsorption (PSA), vacuum swing adsorption (VSA) and vacuum pressure swing adsorption (VPSA) processes. The modular compact design consists of individual module adsorbent bed units which can be connected, stacked or otherwise coupled to form adsorbent bed structures of varying sizes and shapes. As mentioned above, significant capital cost savings can be achieved using the modular and compact adsorbent bed units in adsorption-based gas separation plants. The modular compact design results in smaller modular adsorbent bed units that enable easier adsorbent material loading compared to bulky conventional adsorbent beds. The modular compact design also facilitates increased bed frontal areas and shorter bed depths as desired.

One additional benefit of the modular compact design is the ability to modify the adsorbent bed structure for adsorption plants already in use with minimum effort and shut down times. Each modular adsorbent bed unit may be filled, installed or replaced in the field and new modular adsorbent bed units can be shipped already packed with adsorbent material and ready for installation.

According to this invention, a conventional packed adsorbent bed used in a gas separation plant is replaced with an adsorbent bed structure containing a plurality of modular adsorbent bed units. These modular adsorbent bed units provide higher capacity of gas product per unit volume of adsorbent material (i.e., increased adsorbent utilization) by being an enabler for advanced high rate adsorbent material as compared to that obtained from a conventional packed adsorbent bed using conventional adsorbent material. They also provide substantially reduced pressure drop through the adsorbent bed structure by through the use of shorter bed depths and, optionally, increased flow area.

In one embodiment of this invention, a plurality of modular adsorbent bed units are connected to form the adsorbent bed structure without the need for a separate housing or enclosure. The preferred embodiment has a generally cylindrical design which is compact and easy to fabricate at low cost. Finally, the present invention encompasses both the adsorbent bed structure comprised of a plurality of modular adsorbent bed units and the modular adsorbent bed unit alone.

In another embodiment, an adsorbent bed structure for use in an adsorbent-based gas separation process is provided comprising a plurality of modular adsorbent bed units, each modular adsorbent bed unit having:

a) a feed inlet manifold for receiving feed gas, b) a first gas channel for receiving the feed gas from the feed inlet manifold, c) interior space for moving the feed gas through an adsorbent material confined within the space, d) a second gas channel for receiving product gas exiting the adsorbent material, and e) a product outlet manifold for receiving the product gas from the product gas channel, wherein a first modular adsorbent bed unit is in gas flow communication with at least one other modular adsorbent bed unit by a common gas channel created by the connection of the first modular adsorbent bed to the other modular adsorbent bed unit.

In yet another embodiment, a cyclic adsorption-based gas separation process for removing at least one absorbable gas component from a multi-component feed gas comprising passing the feed gas into an adsorbent bed structure is provided comprising:

a) a plurality of modular adsorbent bed units connected in series, each modular adsorbent bed unit receiving a feed gas from a common feed manifold and having an inlet channel for distributing the feed gas to an adsorbent material, b) an interior space for receiving the feed gas and moving the feed gas through the adsorbent material confined within the space, and c) an outlet channel for receiving and removing a product gas to a common product gas manifold, wherein as the feed gas is passed through the interior space, the absorbable gas component of the feed gas is preferentially adsorbed by the adsorbent material, and a component depleted product gas exits modular adsorbent bed through the outlet channel.

BRIEF DESCRIPTION OF THE DRAWINGS

For a more complete understanding of the present invention, reference should be made to the following Detailed Description taken in conjunction with the accompanying drawings in which:

FIG. 3a is a schematic illustration of a modular adsorbent unit within the adsorbent bed structure shown in FIG. 1 of the present invention.

FIG. 3b is an exploded view of the modular unit shown in 3a.

DETAILED DESCRIPTION OF THE INVENTION

Figure 1:
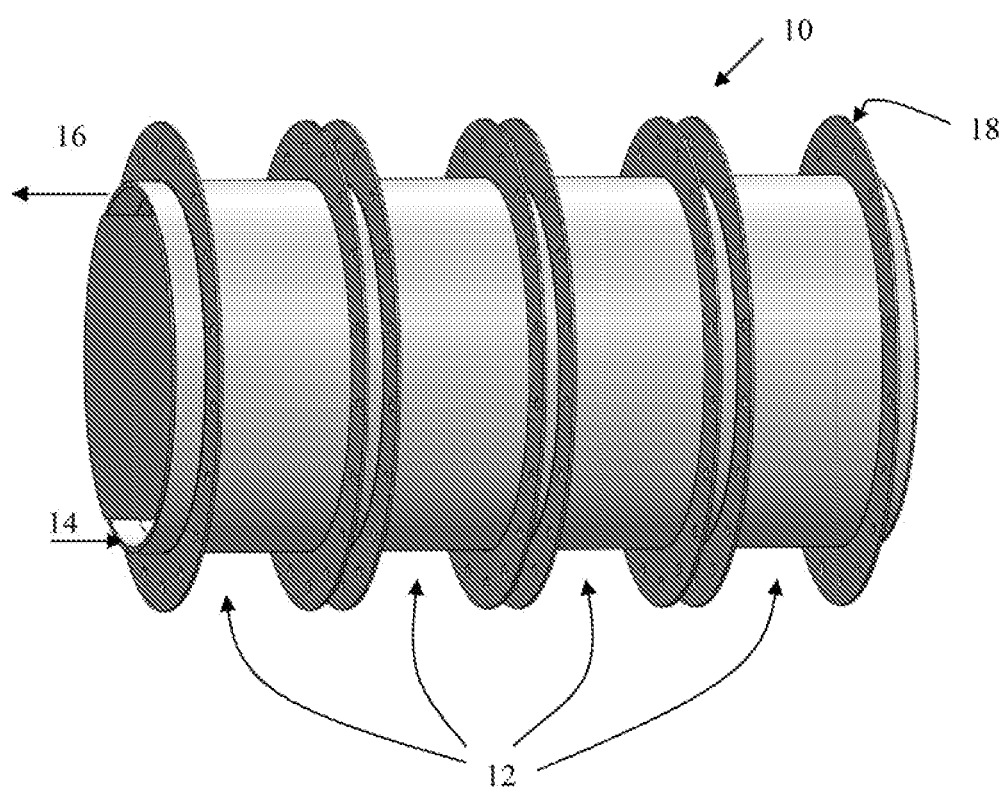
FIG. 1 is an illustration of one embodiment of this invention with a plurality of modular compact adsorbent bed units having a generally circular design and connected to comprise a full sized adsorbent bed structure.

The present invention is directed to a modular compact adsorbent bed structure and process employing modular compact adsorbent bed units and used in gas separation processes included, but not limited to, PSA, VSA and VPSA cyclic processes. The term "modular adsorbent bed unit" or "modular unit" as used herein is the individual unit containing an adsorbent bed with adsorbent material and designed to be combined with one or more other adsorbent modular bed units. The term "adsorbent bed structure" as used herein is the fully assembled bed or vessel structure comprised of a plurality of individual modular adsorbent bed units. The adsorbent bed structure typically includes a housing member to hold the modular adsorbent bed units. The term "frontal area" as used herein is the surface area of one of the gas permeable side walls of the modular unit. The term "bed depth" as used herein is the depth of the adsorbent bed containing adsorbent material measured in the direction of gas flow across the bed. Bed depth is also sometimes referred to as bed transfer length or bed length in the art. The term "adsorbent material" as used herein means a granular adsorbent material in a physical form such as cylindrical pellets, spherical beads, crushed granules or any such agglomerate of the types commonly applied in adsorption processes such as synthetic or natural zeolite molecular sieves, activated carbon, activated alumina, silica gel, etc. The cycle time required for a "conventional" adsorption process depends upon the specific separation and adsorbent. The term "fast cycle" as used herein refers to cyclic adsorption process that have been intensified (shorter bed depth, faster cycle) relative to their conventional process configuration. For example, conventional two-bed adsorption air separation processes using $N_2$-selective zeolites producing 90% or greater $O_2$ purity product typically have a bed depth of 1.0 m or greater and operate with a total cycle time greater than 30 seconds (s). An intensified or fast cycle air separation process would then be one with a cycle time (adsorb/desorb) of less than 30 s and a bed depth reduced approximately in the same proportion as the decrease in cycle time, e.g. a 15 s cycle has a bed depth of 0.5 m.

Adsorption processes have been widely used for the separation or purification of gases and this invention is particularly suitable for adsorption-based cyclic process for VPSA, VSA or PSA as are well known. During operation, a multi-component feed gas, such as air, is introduced to the feed side of the adsorbent bed structure, an absorbable component of the multi-component feed gas, such as nitrogen, is preferentially adsorbed by the adsorbent material in the bed, and a component depleted product gas, such as oxygen, is recovered. In the reverse cycle, the gas flow is reversed to remove or desorb the adsorbed gas component from the adsorbent material in the bed. Desorption is typically carried out in conjunction with a reduction in pressure and/or an increase in temperature that reduces the capacity of the adsorbent material to store the adsorbed component. The cycle is then repeated.

Adsorption processes have been widely used for the separation or purification of gases. An example of a typical adsorption-based process, and the most preferred use of the present invention, is a cyclic, single bed VPSA process. During operation, a multi-component feed gas, such as air, is introduced to the feed side of the adsorbent bed structure, an absorbable component of the multi-component feed gas, such as nitrogen, is preferentially adsorbed by the adsorbent material in the bed, and a component depleted product gas, such as oxygen, is recovered. In the desorption part of the cycle, the gas flow is reversed to remove or desorb the adsorbed gas component from the adsorbent material in the bed. Desorption is typically carried out in conjunction with a reduction in pressure and/or an increase in temperature. The adsorption/desorption cycle is then repeated.

The modular compact adsorption-based bed and process of this invention uses an adsorption bed structure containing a plurality, at least two, modular adsorbent bed units. Each modular unit has an adsorbent bed contained within its side walls and the adsorbent bed has a short depth and a large bed frontal area to promote adsorption/desorption. This design geometry is referred to as a compact or shallow bed. Shallow beds allow for a shorter adsorption cycle to obtain maximum adsorbent utilization. Shallow beds use less adsorbent material per unit of product resulting in a lower pressure drop, smaller process vessel, smaller plant equipment, and smaller skid dimensions, all of which result in capital cost and transportation cost savings. Larger frontal areas permit lower flow velocities and therefore may be optionally applied to decrease pressure drop further through the modular units and the adsorbent bed structure translating into additional operational cost savings. Lower flow velocities through the bed also improve adsorption transfer rate.

The compact shallow bed design intensifies the adsorption/desorption process by operating at a faster cycle, resulting in increased adsorbent utilization (increased product per unit volume of adsorbent material) and reduced pressure drop across the adsorbent bed compared to that obtained from a conventional packed bed. It is also important to achieve even gas flow distribution in shallow beds to avoid maldistribution of gas flow by controlling flow channel design and by minimizing inlet void volume space, i.e. void space on the inlet side of the modular adsorbent bed unit. Good flow distribution across the inlet face of the modular adsorbent bed unit is achieved when the velocity distribution is uniform. Such a condition is influenced by the size and geometry of the inlet space, including the inlet void volume. Flow distribution can be predicted using computational fluid dynamics (CFD) techniques as is commonly known in the art.

FIG. 1 shows an adsorption bed structure (10) having a circular design and does not require a separate adsorbent bed housing or enclosure component. The circular design provides for an even distribution of stress on the outer surface wall structure. In this embodiment, the adsorbent bed units (12) are connected in a "stacked" configuration to comprise the full adsorbent bed structure. FIG. 3a shows an individual modular adsorbent bed unit (12) in an assembled view and FIG. 3b shows the same unit in an exploded view.

Referring again to FIG. 1, the adsorbent bed structure (10) is comprised of four generally circular modular adsorbent bed units (12). Two to eight modular units are used in the preferred configuration. As shown in FIGS. 3a and 3b, each modular unit (12) is comprised of two substantially similar flow separating plates (42), two generally parallel frontal faces (44), and outer side wall (20). The adsorbent material is positioned and retained within the volume of space that is contained within parallel positioned frontal faces (44) and confined by flow separating plates (42) and outer side walls (20) forming the adsorbent bed.

The two frontal faces (44) are typically constructed of perforated plates and wire mesh or cloth screens (not shown), although other means for retaining the adsorbent material can be employed. The outer side wall (20) is non-permeable and there is no process gas flow into or from the modular adsorbent bed unit through the outer side wall (20). Gas flow enters into or exits out of the confined adsorbent material or adsorbent bed through the opposing two frontal faces (44) in a generally axial direction.

The flow separating plates (42) are positioned on opposite sides within the upper and lower inner circular area of outer side wall (20) as shown and are designed to form feed and product manifolds and direct the flow of process gas to and from the individual modular adsorbent bed units (12) through inlet and outlet channels, respectively. In one step of the cycle, the flow enters through the first frontal face (44), passes through the adsorbent material and exits on the reverse side of the adsorbent material through the opposing or second frontal face (44). The width of outer side wall (20), as illustrated by the arrow 20d, of each modular unit are designed to be wider then the depth of the adsorbent bed held therein. The flow separating plates (42) are designed to be generally perpendicular to the outer side wall (20) and are generally shorter in width then the depth of outer wall (20) thereby creating gas flow channels (feed and product channels) there between when connected to a another modular adsorbent gas unit. Alternatively or in combination, the gas flow channels can also be created or expanded using spacers or gaskets placed between the modular units (12) or the outer side walls (20) can be designed with spacing means to fit between the modular units (12) prior to assembly thereby forming the flow channels once assembled. Flange (18) can optionally be used as means to connect the modular units (12) using conventional fasteners such as bolts and nuts.

Figure 2:
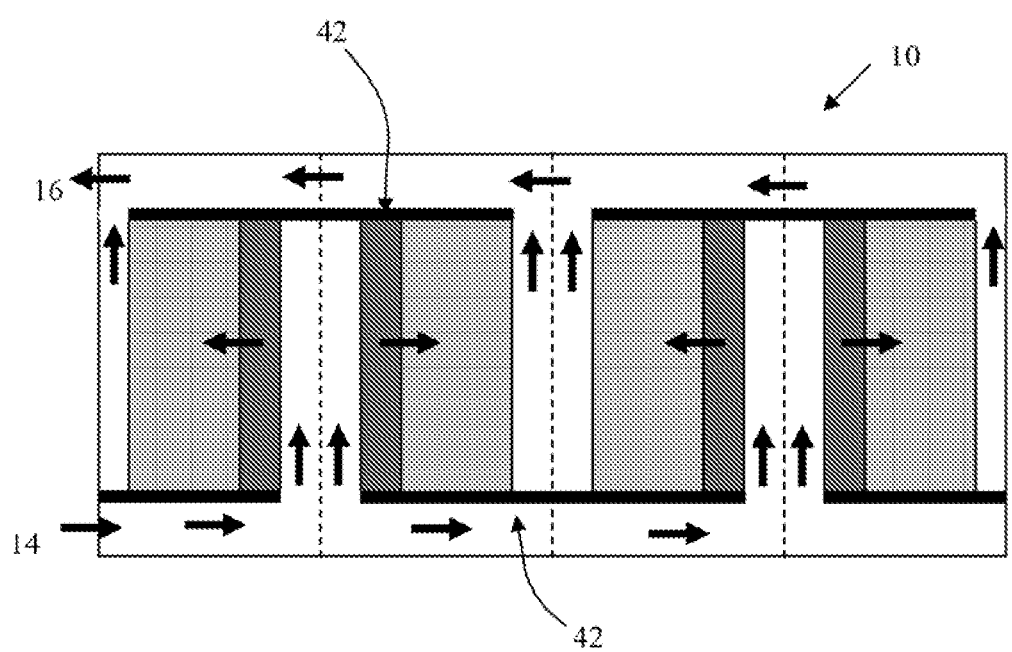
FIG. 2a is a schematic illustration of the embodiment of FIG. 1 showing the gas flow distribution during one phase of a typical cyclic adsorption process through the assembled adsorbent bed structure.

As shown, the embodiment in FIG. 1 does not require separate feed or product manifold components as the cavity formed internally within the outer side wall (20) by connecting flow separating plates (42) creates an inlet/outlet gas flow conduit or manifold. As illustrated, theses manifolds or gas flow conduits are formed during assembly. FIG. 2 is an illustration of the adsorbent gas structure with four modular units as shown in FIG. 1 with arrows showing the direction of gas flow and the gas channels (32, 34) created by the connections of the modular units.

According to FIGS. 1 and 2, feed gas enters the adsorbent gas structure (10) through the inlet feed manifold (14) which is the cavity created by the connection of the modular adsorbent bed units (12) and flow separating plates (42). On the opposite internal side of outer side wall (20), a substantially identical product outlet manifold (16) is formed. The feed gas flows into the inlet feed manifold (14) into the feed gas channel (32) and then through the adsorbent bed between frontal faces (44). A product gas exits the adsorbent bed through product gas channel (34) and out the product outlet manifold (16). Each end of the adsorbent bed structure (10) is connected to the necessary piping and valves in the adsorption plant for feed, product, and reflux flows to operate in a conventional adsorption process (not shown).

Each modular adsorbent bed unit (12) is designed such that, on one side of the frontal face (44), the flow separating plates (42) connect to the adjoining gas flow plate on the next modular unit (12) to form multiple gas flow channels (feed gas and product gas channels) in alternating order. Thus, each modular adsorbent bed unit (12) is connected to the next in a way that permits the feed inlet manifold and the product outlet manifold (14, 16) to communicate with alternating channels proximate to opposite frontal faces (44). Referring to FIG. 2, the feed gas flows from the feed manifold (14) to the inlet channel (32), formed between two connected modular units, and through the adsorbent material. The product gas is received on the opposite side of the adsorbent bed by the outlet channel (34) which is formed between the two modular bed on the opposite side of the adsorbent material. The feed gas is depleted of the gas component preferential adsorbed by the adsorbent material and a product gas exits through the product manifold (16) formed by the connected flow separating plates (42). In this manner and as best shown in FIG. 2, alternate feed and product channels (32,34) are created by the assembly of the modular units in which the flow separating plates (42) alternately connect. In a cyclic adsorption/desorption process, the process gas flow is in the same direction from the feed inlet manifold through the adsorbent material and to the product outlet manifold during the adsorption step and then reversed during the desorption step.

In actual assembly, each of the modular adsorbent bed units (12) shown here can be substantially identical in shape and alternating modular units are flipped 180 being degrees on their circumference (being mirror images of one another) to construct the adsorbent bed structure (10) having the inlet and outlet manifolds and gas flow channels shown. For example, in an adsorbent bed structure (10) comprised of 4 modular units (12), the sequence of gas flow channels formed between the modular units at the top will be in an open (to the feed inlet manifold), closed, open and closed in an alternating pattern. The gas flow channels open to the feed inlet are closed to the product outlet manifold thereby forcing the feed gas through the adsorbent bed and those closed to the feed inlet manifold are open to the product outlet manifold and receive the product gas exiting the adsorbent bed.

In the cyclic process, the directions of all flows are reversed for the desorption step. During the adsorption step, gas remaining in the void spaces of the vessel as well as gas adsorbed within the adsorbent is removed in a direction counter current (opposite) to the direction of the feed flow. In the reverse flow, the feed inlet manifold becomes the outlet manifold and the product outlet manifold becomes in inlet manifold. The desorption step may be carried out at a pressure above or below atmosphere pressure, at ambient or elevated temperature and with or without a positive purge gas.

As is apparent to one skilled in the art, the outer side walls (20) must be hermetically sealed and the means for sealing the outer side walls (20) and flow separating plates (42) must be designed to seal in pressure and/or vacuum (or high and low pressure) and not permit any internal leaks. Each modular unit is designed and built to be self-contained, fully resistant to pressure and vacuum forces, and able to withstand the pressure variation of a pressure swing cyclic adsorption process. The modular adsorbent bed units (12) are not restricted to the circular or cylindrical geometry as shown and can be of varying shapes including, but not limited to, oval, ellipsoidal, conical, square, cuboidal or rectangular, box shaped.

This invention uses the concept of an adsorbent bed having a large frontal area and a short bed depth (shallow bed) to enhance the efficiency of the adsorption process. Referring again to FIGS. 3a and 3b, the largest dimension of modular unit (12) is the diameter of frontal faces (44) and the smallest dimension is the width of the modular unit (12), shown as arrow 20d, which is equal to or greater then the adsorbent bed depth. The total area of each frontal face is greater than the total area of the outer side walls of the modular adsorbent bed unit. The ratio of the diameter of one of the frontal face (44) to the depth of the adsorbent bed in the modular unit (20d) is preferably between 1 and 10 and most preferably between 1.5 and 7.

To take advantage of the modular compact design with a shallow bed and a large frontal face, the adsorbent bed must be densely packed. Preferably, the modular units of this invention will have adsorbent material which has been densely packed. Bed voidage as used here is understood in the art and more fully described in U.S. Pat. No. 5,324,159. As described in GB Pat. No. 606,867 and by W. E Gross et al., dense uniform packing of the adsorbent can be achieved using a gravity-assisted filling method, in which adsorbents are dropped from a certain height in perpendicular direction to the bed depth, passed through the series of wire screens, and filled into the enclosed bed volume (W. E. Gross, J. C. Goshorn, "An Instrument for Determining the Volume and Bulk Density of Granular Materials", *ASTM Bulletin*, pp. 55-59 (March 1948)). With this method it is possible to achieve a dense packing of adsorbent particles in the bed with an interparticle void fraction of less than 40% and most preferably 37% or less. Densely packed adsorbent material is confined within the modular unit (12) between frontal faces (44), outer side wall (20) and flow separating plates (42) forming the adsorbent bed.

Although the present invention is described herein as being used in a PSA, VSA or VPSA cyclic processes, this invention is applicable to any fixed bed adsorption-based gas separation process or apparatus using a packed adsorbent material to separate or remove gas components or purify gas and is not limited to a cyclic process. Examples of suitable processes include oxygen VPSA systems; hydrogen PSA systems; PSA and thermal swing adsorption (TSA) air purification systems; $CO_2$ VPSA systems; nitrogen PSA systems; and ethanol dehydration systems. Other adsorbent based gas separations processes can include processes for the separation of gases such as hydrogen, argon and carbon dioxide and for the removal of water. Preferred are fast cycle cyclic processes and most preferred are air separation processes wherein the oxygen and nitrogen gases are separated.

A wide range of adsorbent materials can be used depending on the process employed. Preferably, the adsorbent materials will be porous particulate materials such as molecular sieves. For air separation PSA processes, the adsorbent material is typically a zeolite molecular sieve material as are known and commercially available. The adsorbent material used within the modular adsorbent bed unit can be composed of a single layer material or, in the case of air separation using nitrogen selective zeolites, a two layer material configuration is preferred, i.e., the first layer nearest the feed inlet removes water and the second layer serves as the nitrogen selective adsorbent material. There may be an increased number or layers, e.g., three or four, packed within the modular adsorbent bed unit, depending on the desired adsorption application and process design. For example in air separation applications, the first layer typically removes carbon dioxide in addition to water. The adsorbent material may be packed particles or may be an adsorbent arrangement in the form of a monolithic adsorbent. The adsorbent material can also be coated onto thin plates in the form of honeycomb cellular structures with enough open area to allow sufficient gas molecules to flow through.

As discussed, the adsorbent material is densely packed and retained between two parallel frontal faces (44) which are porous to allow process gas to flow in and out of the adsorbent bed while confining the adsorbent material. Varying structural containment means or packing constraints can be employed providing the containment means used will retain the absorbent materials in proper position and allow the process gases to flow through the material without fluidizing it under normal conditions of use. In addition, means for creating force on the adsorbent material, such as a spring-loaded plate or pressurized bladder (not shown), can be placed inside the modular adsorbent bed unit (12) and within the outer side wall (20) on the top or bottom of the adsorbent material to apply continuous pressure to the adsorbent material and prevent it from bypassing flow at the surfaces not designed for gas flow.

Referring again to FIGS. 1 and 2, it is preferred that feed inlet manifold (14), product outlet manifold (16) and gas flow channels (32, 34) are constructed to be generally symmetrical for ease of manufacturing. However, they can be tapered in shape or gas flow baffles, guide vanes, screens, or restrictors can be employed (not shown) as may needed to aid in distribution of the process gas through the modular adsorbent bed units (12).

The modular units (12) are designed to provide an adsorbent bed structure (10) with sufficiently sized inlet/outlet manifolds and gas flow channels to supply adequate process gas flow, but with minimum void volume ratios. High void volume ratios in cyclic systems reduce the efficiency of the process. The "void volume ratio" is defined here as the ratio of the feed side or inlet void volume (e.g. feed pipe, feed manifold and feed channel) to adsorbent volume, which includes the inter-particle space within the adsorbent material. The void volume ratio is a measure of inefficiency of the system because the inlet void volume is filled with pressurized gas during feed step and later this gas is discarded during desorption, thus creating a penalty to power. The adverse effect of inlet void volume on the process increases with shorter cycle times and shallower beds. High void volume ratios also adversely affect process performance by reducing recovery and production capacity and increasing power consumption. The faster the cycle, the more adverse the impact of the void volume ratio is on the process performance.

Thus, in fast cycle cyclic processes the void volume ratio becomes an important factor and small void volume ratios of less than 30% are preferred in the adsorbent bed structures. To aid in achieving this void volume ratio, the distance between the modular adsorbent bed units (12) is preferably equal to approximately 50% or less of the adsorbent bed depth.

One method of reducing void volumes is to fill the void spaces with inert fillers, such as ceramic balls, to reduce void volume without significant increase in pressure drop. Fillers not only reduce the void volumes but also help to enhance gas flow distribution for each modular adsorbent bed unit. Another method of reducing void volumes is to improve the flow channel design wherein the product gas channel (34) is narrower than the feed gas channel (34) which can be controlled by the use of spacers between modular units or gas flow restrictors with the channels. This is most suitable for bulk separations as the product mass flow is substantially lower than the feed mass flow.

The present invention includes adsorbent beds structures that can be employed in various adsorption processes including simultaneous adsorption cycles (single-feed), or cycles that are out of phase (multi-feed). A plurality of modular adsorbent bed units can be used with one or multiple adsorbent bed structures in processes such as single-bed, two-bed, three-bed, or multi-bed process modes. The capacity of the adsorbent bed structure can be varied through the adjustment of any or all of the modular adsorbent bed unit's height and width and the number of modular units installed within the adsorbent bed structure.

It should be apparent to those skilled in the art that the subject invention is not limited by the examples provided herein which have been provided to merely demonstrate the operability of the present invention. The scope of this invention includes equivalent embodiments, modifications, and variations that fall within the scope of the attached claims.

What is claimed is:

1. An adsorbent bed structure for use in an adsorbent-based gas separation process comprising a plurality of modular compact adsorbent bed units, each modular adsorbent bed unit having:
   a) a feed inlet manifold for receiving feed gas,
   b) a first gas channel for receiving the feed gas from the feed inlet manifold,
   c) interior space for moving the feed gas through an adsorbent material confined within the space,
   d) a second gas channel for receiving product gas exiting the adsorbent material, and
   e) a product outlet manifold for receiving the product gas from the second gas channel,
   wherein a first modular adsorbent bed unit is in gas flow communication with at least one other modular adsorbent bed unit in a generally axial direction by a common gas channel created by the connection of the first modular adsorbent bed to the other modular adsorbent bed unit and wherein the adsorbent bed structure is created by the stacked connection of two or more modular adsorbent bed units having generally cylindrical outer side walls and the adsorbent material is densely packed having a bed voidage of less than 40%.

2. The adsorbent bed structure of claim 1 wherein the feed inlet manifold and the product outlet manifold are created by the connection of the modular adsorbent bed units.

3. The adsorbent bed structure of claim 1 wherein each modular adsorbent bed unit is comprised of two flow separating plates internally positioned within the outer side walls and at opposite sides of the outer side walls.

4. The adsorbent bed structure of claim 3 wherein the adsorbent material is contained within two parallel opposed frontal faces enclosed within the outer side wall and the flow separating plates of the modular adsorbent bed unit.

5. The adsorbent bed structure of claim 4 wherein the opposed frontal faces are gas permeable and the outer side wall and flow separating plates are non-permeable.

6. The adsorbent bed structure of claim 5 wherein the feed gas is moved axially through the two parallel opposed frontal faces of the modular adsorbent bed unit.

7. The adsorbent bed structure of claim 4 wherein the total area of each frontal face is greater than the total area of the outer side walls of the modular adsorbent bed unit.

8. The adsorbent bed structure of claim 4 wherein the ratio of the diameter of one frontal face of the two parallel opposed frontal faces to the depth of the adsorbent bed is between 1 and 10.

9. The adsorbent bed structure of claim 1 wherein the inlet manifold evenly distributes the feed gas to the first inlet channels.

10. The adsorbent bed structure of claim 1 used in a PSA, VSA, or VPSA process.

11. The adsorbent bed structure of claim 10 having a void volume ratio of less than 30%.

12. The adsorbent bed structure of claim 10 wherein the distance between the modular adsorbent bed units is equal to 50% or less of the adsorbent bed depth.

13. An adsorption bed structure for adsorbent-based cyclic processes comprising:
   a) a plurality of connected modular adsorbent bed units located generally parallel to one another in a stack-like arrangement and able to withstand the pressure variation of a pressure swing cyclic adsorption process, each of the modular adsorbent bed units having two opposed faces with an adsorbent bed within the opposed faces in which process gas streams are introduced into and discharged from the modular adsorbent bed units-in a generally axial direction when the adsorption bed structure is subjected to an cyclic adsorption process;
   b) a plurality of flow channels located between the modular adsorbent bed units and at opposite ends of the adsorbent bed comprising a first set of channels, each in communication with one of the two opposed faces of each of the modular adsorbent bed units and a second set of channels each in communication with the opposite side of the two opposed faces of each of the modular adsorbent bed units such that the first set of channels introduce process gas streams into one side of the two opposed faces and the second set of channels collect the process gas streams from the opposite face of the two opposed faces; and
   c) first and second manifolds in flow communication with the first set of channels and the second set of channels, respectively, to introduce the gas process streams into the first set of channels and withdraw the process gas streams from and the second set of channels; and d) and wherein the adsorbent beds within the plurality of modular adsorbent bed units contain densely packed adsorbent material having a bed voidage of less than 40%.

14. A modular compact adsorbent bed unit comprising:

a) a circular outer wall, b) two flow separating plates perpendicularly positioned on the interior of the outer wall on opposite sides of the outer wall, c) an interior space between the flow separating plates and within the outer wall, d) two gas permeable faces on opposing sides of the interior space and connected to the flow separating plates and the outer wall, and e) a particulate molecular sieve adsorbent material densely packed having a bed voidage of less than 40% within the gas permeable faces, wherein when the modular unit is connected to one or more other modular adsorbent bed units in a stack configuration, gas flow channels capable of directing gas flow axially through the gas flow channels, one gas permeable face, the adsorbent material, and the second gas permeable face are formed therein.

* * * * *